(12) United States Patent  
Vichare (10) Patent No.: US 8,972,968 B1  
(45) Date of Patent: Mar. 3, 2015

(54) ALTERNATE SERVICE FOR APPLICATIONS

(75) Inventor: Vivek P. Vichare, Aliso Viejo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 222 days.

(21) Appl. No.: 13/485,008

(22) Filed: May 31, 2012

(51) Int. Cl.
   *G06F 9/44* (2006.01)

(52) U.S. Cl.
   USPC ........................................ 717/170

(58) Field of Classification Search
   USPC ........................................ 717/170
   See application file for complete search history.

(56) References Cited

U.S. PATENT DOCUMENTS

| | | | | |
|---|---|---|---|---|
| 5,951,694 | A * | 9/1999 | Choquier et al. | 714/15 |
| 6,006,264 | A * | 12/1999 | Colby et al. | 709/226 |
| 6,185,601 | B1 * | 2/2001 | Wolff | 709/203 |
| 6,519,767 | B1 * | 2/2003 | Carter et al. | 717/140 |
| 6,836,795 | B2 * | 12/2004 | Soderberg et al. | 709/223 |
| 7,188,163 | B2 * | 3/2007 | Srinivasan et al. | 709/221 |
| 7,206,852 | B2 * | 4/2007 | Ferguson et al. | 709/229 |
| 8,180,871 | B2 * | 5/2012 | Brittenham et al. | 709/223 |
| 2005/0132346 | A1 * | 6/2005 | Tsantilis | 717/168 |
| 2010/0306757 | A1 * | 12/2010 | Becker et al. | 717/170 |
| 2012/0089669 | A1 * | 4/2012 | Berg et al. | 709/203 |
| 2012/0197718 | A1 * | 8/2012 | Martchenko et al. | 705/14.53 |
| 2013/0139148 | A1 * | 5/2013 | Berg et al. | 717/177 |

* cited by examiner

*Primary Examiner* — John Chavis
(74) *Attorney, Agent, or Firm* — Thomas | Horstemeyer, LLP (57) ABSTRACT

Disclosed are various embodiments to accommodate incompatibilities between differing versions of client and server applications. The client application establishes, via a network of a client computing device, data communication with a interface of a primary server application in a server computing device, the interface including a server version identifier. The client application obtains, via the interface, the server version identifier. Based upon the server version identifier, the client application establishes, via the network of the client computing device, data communication with an alternate server application.

20 Claims, 4 Drawing Sheets

ALTERNATE SERVICE FOR APPLICATIONS

BACKGROUND

In a networked environment, a client application may depend upon the services of a server application for all or a portion of the functionality of the client application. However, updates may be made to the client and server applications that may not be available on all devices in which the applications are used. As time passes, the number of different versions of applications in use grows.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing an alternate service or source of services to networked clients who may be using older or incompatible versions of a client application. A client application requesting service from a server application may exchange application version information with the server. Based at least upon this exchanged version information, the server application modifies the services offered to the client and/or redirects the client application to an alternate server application that may be more compatible. In some embodiments, the client application may itself choose or request an alternate server application based upon the exchanged version information. In the following discussion, a general description of the system and its components is provided, followed by a discussion of the operation of the same.

Figure 1:
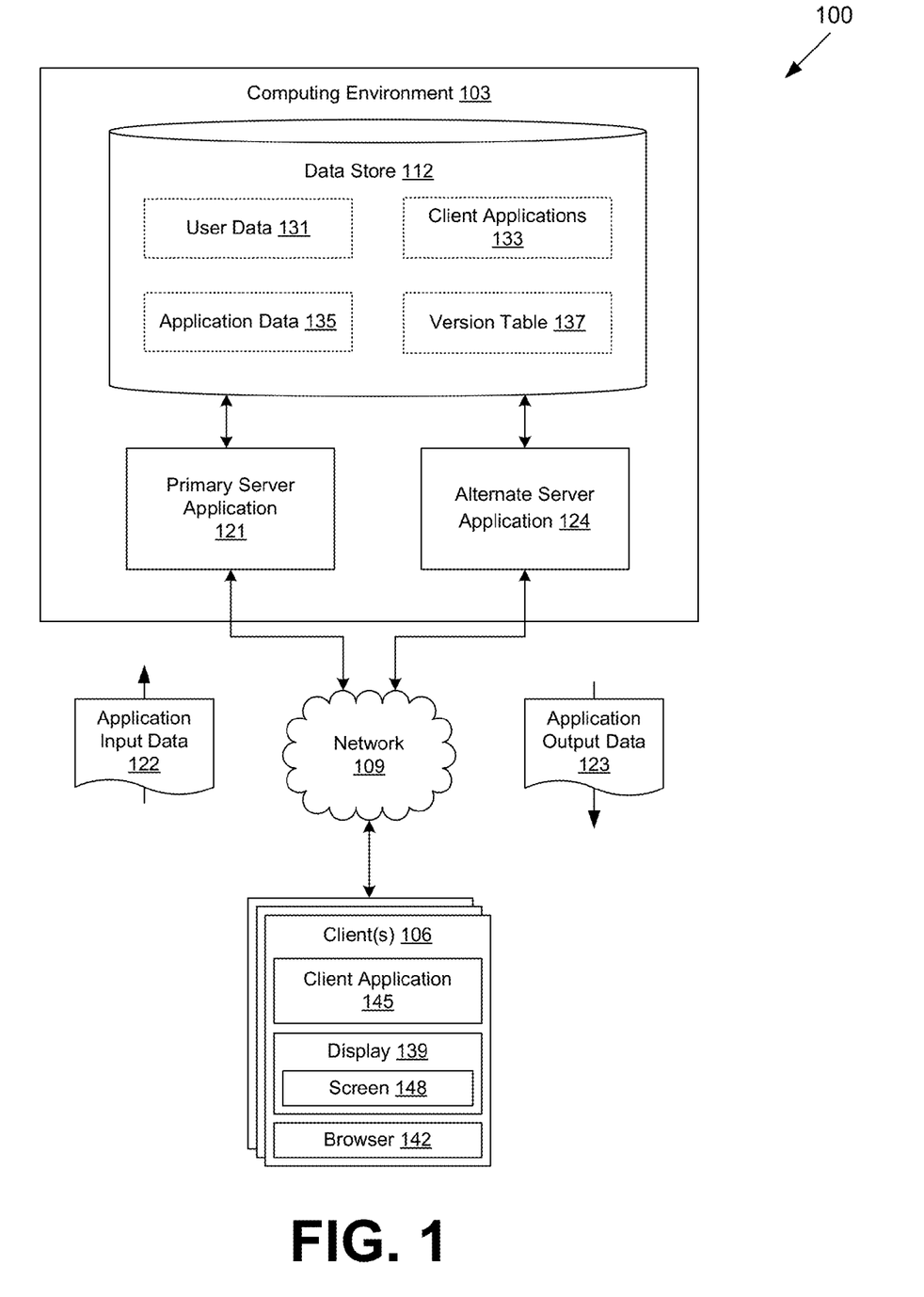
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may comprise a plurality of servers or other computing devices that are arranged, for example, in one or more server banks or computer banks or other arrangements. For example, the computing environment 103 may comprise a cloud computing resource, a grid computing resource, and/or any other distributed computing arrangement. The computing environment 103 may be located in a single installation or may be distributed among many different geographical locations.

Various applications and/or other functionality may be executed in the computing environment 103 according to various embodiments. Also, various data is stored in a data store 112 that is accessible to the computing environment 103. The data store 112 may be representative of a plurality of data stores as can be appreciated. The data stored in the data store 112, for example, is associated with the operation of the various applications and/or functional entities described below.

The components executed on the computing environment 103, for example, include a primary server application 121, an alternate server application 124, and other applications, services, processes, systems, engines, or functionality not discussed in detail herein. The primary server application 121 is executed in order to support and facilitate the activities of a client application executing in a client 106 over the network 109. The primary server application 121 may interact with the client 106 receiving application input data 122 and sending application output data 123. Such communication with the client 106 may occur via an application programming interface (API) or other programmatic interface. The interface may be implemented using various protocols such as, for example, hypertext transfer protocol (HTTP), simple object access protocol (SOAP), representational state transfer (REST), user datagram protocol (UDP), transmission control protocol (TCP), and/or other protocols for communicating data over the network 109.

The alternate server application 124 is also executed in order to support and facilitate the activities of a client application over the network 109 through the communication of application input data 122 and application output data 123. In one embodiment, the alternate server application 124 may support a different version of the API offered by the primary server application 121. In another embodiment, the alternate server application 124 may generate content pages such as, for example, web pages, gopher pages, mobile application screens, and/or other forms of network content that are provided to clients 106. In this embodiment, the alternate server application 124 may correspond to a commercially available hypertext transfer protocol (HTTP) server such as, for example, APACHE HTTP Server, APACHE TOMCAT, MICROSOFT Internet Information Services (IIS), etc. In some embodiments, the alternate server application 124 may be executed in an alternate computing device connected to the network 109.

The data stored in the data store 112 includes, for example, user data 131, applications 133, application data 135, a version table 137, and potentially other data. The user data 131 includes various data related to the users of the client application, such as, for example, security credentials, application preferences, billing information, and so on. The applications 133 correspond to a library of different applications that are available to be retrieved by the client 106. The applications 133 may correspond to executable code within the client 106 and may be the same or different versions of a client application in the client 106.

The application data 135 comprises data that has been saved by the primary server application 121 and alternate server application 124. The application data 135 may further comprise data associated with the state of a session between a client application and the server applications, settings associated with the client application and the server applications, back-end support of the server applications, and/or other data. The version table 137 contains a compatibility matrix of versions client applications with versions of the primary server application 121 and alternate server application 124. The version information for the client applications and the server application may be further subdivided into component versions such as, for example, the version of a web page rendering engine of a client application, a version of the API used by a server application, a version of a software module, and/or other types of components as can be appreciated.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a browser 142, a client application 145, and/or other applications. The browser 142 may be executed in a client 106, for example, to access and render network pages, such as web pages, or other network content served up by the computing environment 103 and/or other servers. The client application 145 is executed to provide a service and/or allow a user to interact with the service of the client application 145. To this end, the client application 145 may communicate with the primary server application 121 and/or alternate server application 124 to, for example, authenticate a user, access data, process data, store data, and/or other services as can be appreciated.

As a non-limiting example, a client application 145 may offer an interface through which a user may purchase items through an electronic commerce system and check the status of items previously ordered. In some embodiments, the client application 145 may also provide geographic location data through the use of the Global Positioning System (GPS), cellular network positioning, Wi-Fi™ positioning and/or other location techniques. The client 106 may be configured to execute applications beyond browser 142 and client application 145 such as, for example, email applications, instant message applications, and/or other applications. Any application executed in the client 106 may render a screen 148 on the display 139.

Next, a general description of the operation of the various components of the networked environment 100 is provided. To begin, a client application 145 in a client 106 initiates a session with a primary application server 121 in a computing environment 103. During the initiation, the client application 145 and primary server application 121 may exchange version information. The client application 145 may provide a version of the server application expected, a version identifier for the API over which it may communicate, a general version identifier for the client application 145, version identifiers for components of the client application 145, and/or other version information as can be appreciated. In some embodiments, only the client application 145 or the primary server application 121 may provide version information.

Similarly, the primary server application 121 may provide a version of the client application 145 expected, a version identifier of the API over which it may communicate, a general version identifier for the primary server application 121, version identifiers for components of the primary server application 121, and/or other version information as can be appreciated. Upon exchanging version information, the client application 145 and primary server application 121 may determine compatibility based upon the version information received. To this end, the primary server application 121 may use compatibility information from the version table 137, while similar compatibility information may be available to the client application 145. In some embodiments, the primary server application 121 or the client application 145 may not locally determine compatibility. Instead, the task may be left to the other device.

As a non-limiting example, the client application 145 may initiate a session with the primary server application 121. The client application 145 may report that it communicates using v2.0 of the API, and the primary server application 121 may report that it offers v2.0 of API. In this example, because the versions of the API used by both the server and the client match, the communication session between the client application 145 and the primary server application 121 may proceed.

In some embodiments, the exchange of version information may employ negotiation. For example, the client application 145 may report that it communicates using v3.0 of the API, and the primary server application 121 may report that it offers v2.0 of the API. If the client application 145 is also capable of communicating using v2.0 of the API, it may respond in kind to the primary server application 121 with a modified report. Such techniques may be used if, for example, v3.0 of the API is preferable to v2.0, so an attempt to use v3.0 may first be made.

In other embodiments, the version information may indicate support for all or a portion of prior versions. For example, the client application 145 may report that it communicates using v2.5 of the API, and the primary server application 121 may report that it offers v2.0 of the API. In this example, v2.5 may indicate that any version between v2.5 and the last significant revision, version 2.0, is supported without further negotiation. Such a technique may represent a tacit indication that the preference is for the version of the API provided, v2.5, but that the capability exists to communicate using versions down to v2.0. Information about support for versions may be obtained from version table 137 or similar data sources, and/or the information may be implicit in the system of version identifiers such as in this example.

The technique may be further extended by explicitly including the range of versions supported by the primary server application 121 and client application 145. For example, the client application 145 may report that it communicates using v2.5-v1.5 of the API, and the primary server application 121 may report that it offers v2.0 of the API. In this example, the primary server application 121 and client application 145 may communicate using v2.0 of API, the most recent version common to both the server and the client.

Compatibility may also be determined on the basis of versions or data other than the version of the API supported. For example, the client application 145 may identify itself as v1.0 using v1.0 of the API, and the primary server application 121 may report itself as v1.5 using v1.0 of the API. Although the API versions are compatible, the version table 137 may indicate a known problem between v1.0 of the client application 145 and v1.5 of the primary server application 121. In this example, the version table 137 may indicate one or more responses to the incompatibility such as, for example, modifications to the features or functionality available to the client application 145 during the communication session, use of an alternate server application 124, changing the version of the client application 145, and/or other possible responses.

If the primary server application 121 chooses a response involving the use of an alternate application server 124, the primary server application 121 may issue a redirection instruction to the client application 145 comprising the network address for the alternate application server 124, authentication credentials, and/or other data as can be appreciated. In some embodiments, the alternate server application 124 may offer similar services as the primary server application 121, but with components that may be more compatible to a given client application 145. Returning to the previous example of a known problem between a v1.0 client and a v1.5 server, the alternate server application 124 may be a v1.0 server, like the client, or any other version known to be more compatible with the version of the given client application 145.

In other embodiments, the alternate server application 124 may be a network page server such, for example, a web server. In this embodiment, the alternate server application 124 may serve as a lingua franca among a web of various versions and incompatibilities that may exist between the client application 145 and the primary server application 121. In this embodiment of the alternate server application 124, the client application 145 may interact with the alternate server application 124 using a network page rendered within the client application 145.

As a non-limiting example, the client application 145 may identify itself as v3.0, and the primary server application 121 may identify itself as v7.0. In this example, the client application 145 may determine that the version of the primary application server 121 is incompatible with itself, and issue a request to the primary server application 121 for an alternate application server. The primary server application 121 may use the version table 137 to determine an alternate application server 124 that is likely to be compatible with the given client application 145. In some instances, the most compatible alternate application server 124 may be one that makes a network page available for access by the client 106. The selection of an alternate application server 124 by the primary application server 121 may be performed asynchronously, thereby allowing requests to be issued by the client application 145 or redirection instructions to be issued by the primary application server 121.

Although an alternate server application 124 serving network pages to the client applications 145 may serve as a bridge among the potential various versions of applications and incompatibilities, network pages may also evolve to develop requirements and incompatibilities as well. For example, a network page of the alternate server application 124 may be updated to require hypertext markup language (HTML) v5, Adobe Flash®, and/or other technologies. In this case, the client application 145 may be unable to properly render the network pages within the client application 145 itself. In this circumstance, the primary application server 121 may instruct the client application 145 to use an alternate application server 124, but to establish the session using the browser 142 in the client 106.

As a non-limiting example, the client application 145 initiate a communication session identifying itself as v1.0, and the primary server application 121 may identify itself as v7.0. In this example, after consulting the version table 137, the primary server application 121 may determine that the network page rendering capability of v1.0 of the client application 145 is not compatible with the alternate application servers 124. Therefore, the primary server application 121 may issue a redirection instruction comprising a network address of an alternate application server 124 and a directive to establish communications using a browser 142. In some embodiments, the alternate application server 124 may perform another exchange of version information to further ensure that client application 145 and/or browser 142 is compatible with the network pages.

In addition to redirection instructions, the primary server application 121 may issue one or more notices to the client application 145 associated with versions and potential incompatibilities. For example, the client application 145 may identify itself as v1.0, and the primary server application 121 may report itself as v1.5. Although no incompatibilities may exist, the version numbers may indicate that a newer version of the client application 145 is available. As such, the primary server application 121 and/or an alternate server application 124 may provide notice to any client application 145 of updates that are available.

In some embodiments, the notice may become increasing insistent as the potential for problems with a given version of a client application 145 increases. For example, if a given version of a client application 145 is discovered to suffer from a security vulnerability, the primary server application 121 and/or an alternate server application 124 may apply an update to the client application 145 without user intervention. Similarly, if a client application 145 is older than a predefined threshold, the client application may require a user to update the application before offering any or a portion of the functionality.

Figure 2:
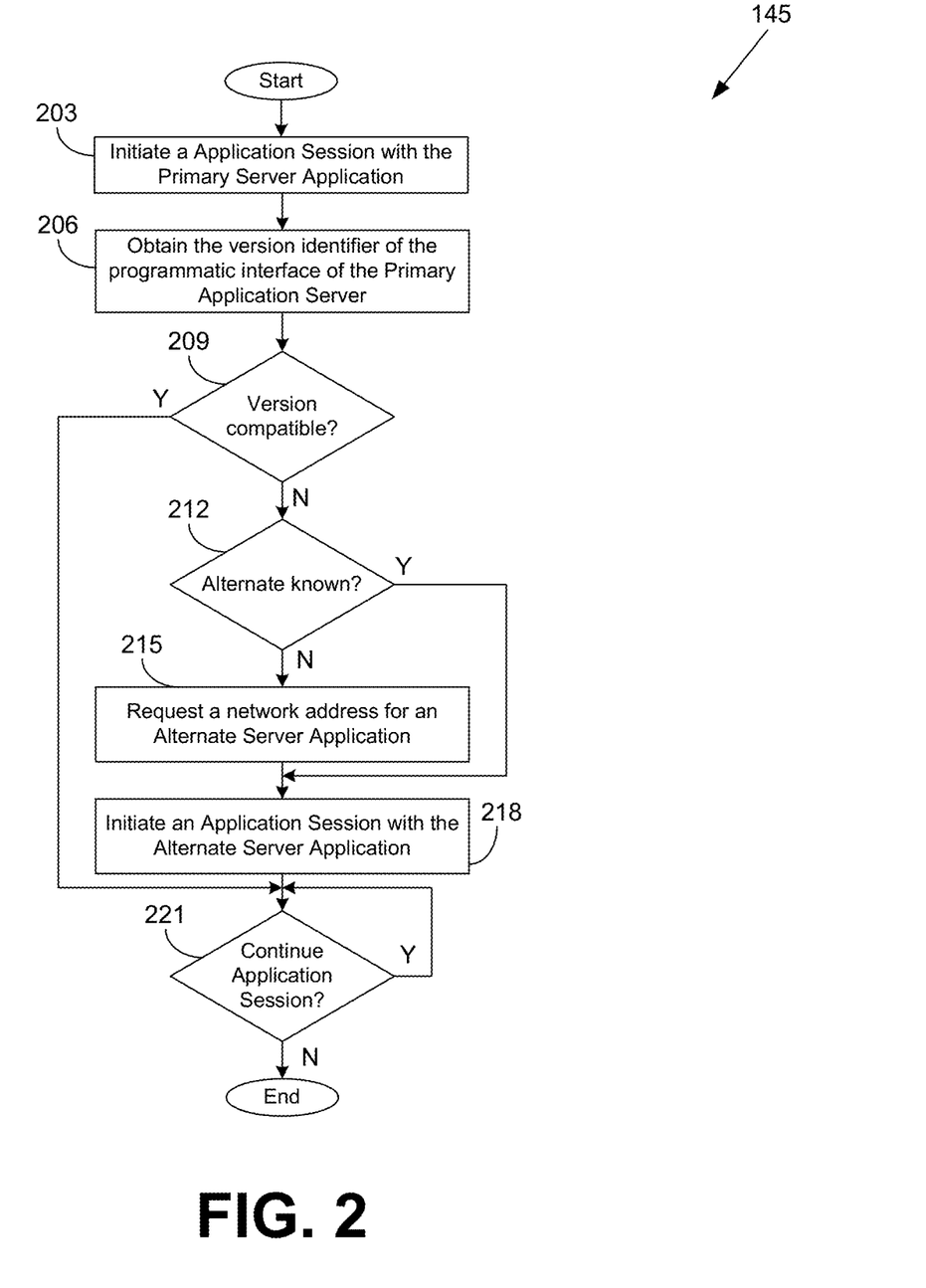
FIG. 2 is a flowchart illustrating one example of functionality implemented as portions of a client application executed in a computing environment in the networked environment of FIG. 1 according to various embodiments of the present disclosure.

Referring next to FIG. 2, shown is a flowchart that provides one example of the operation of a portion of the client application 145 according to various embodiments. It is understood that the flowchart of FIG. 2 provides merely an example of the many different types of functional arrangements that may be employed to implement the operation of the portion of the client application 145 as described herein. As an alternative, the flowchart of FIG. 2 may be viewed as depicting an example of steps of a method implemented in the computing environment 103 (FIG. 1) according to one or more embodiments.

This portion of the client application 145 may be executed in response to a user or other source requesting an action requiring communication with the primary server application 121 (FIG. 1). Beginning with box 203, the client application 145 initiates an application session with the primary server application 121 over the network 109 (FIG. 1). Next, in box 206, the client application 145 and the primary server application 121 exchange version information. As discussed previously, the version information may comprise general versions for the client application 145 and the primary server application 121.

Then, in box 209, the client application 145 may determine if the primary server application 121 is compatible with itself. The determination may be made based at least upon the version information exchanged, as well as compatibility information available to the client application 145. If the primary server application 121 is compatible, execution of the client application 145 proceeds to box 221. However, if the primary server application 121 is not compatible, execution of the client application 145 proceeds to box 212.

Subsequently, in box 212, the client application 145 determines if an alternate server application 124 is known. If an alternate server application 124 is known and the corresponding network address is determinable, execution of the client application 145 proceeds to box 218. Alternatively, if an alternate server application 124 is not known, in box 215, the client application 145 requests a network address of an alternate application server 124. Then, in box 218, the client application 145 initiates an application session with the alternate server application 124.

Next, in box 221, the client application 145 determines if the application session should end. If the communication session should continue, execution of the client application 145 continues as shown. Alternatively, if the application session should end, execution of this portion of the client application 145 ends as shown.

Figure 3:
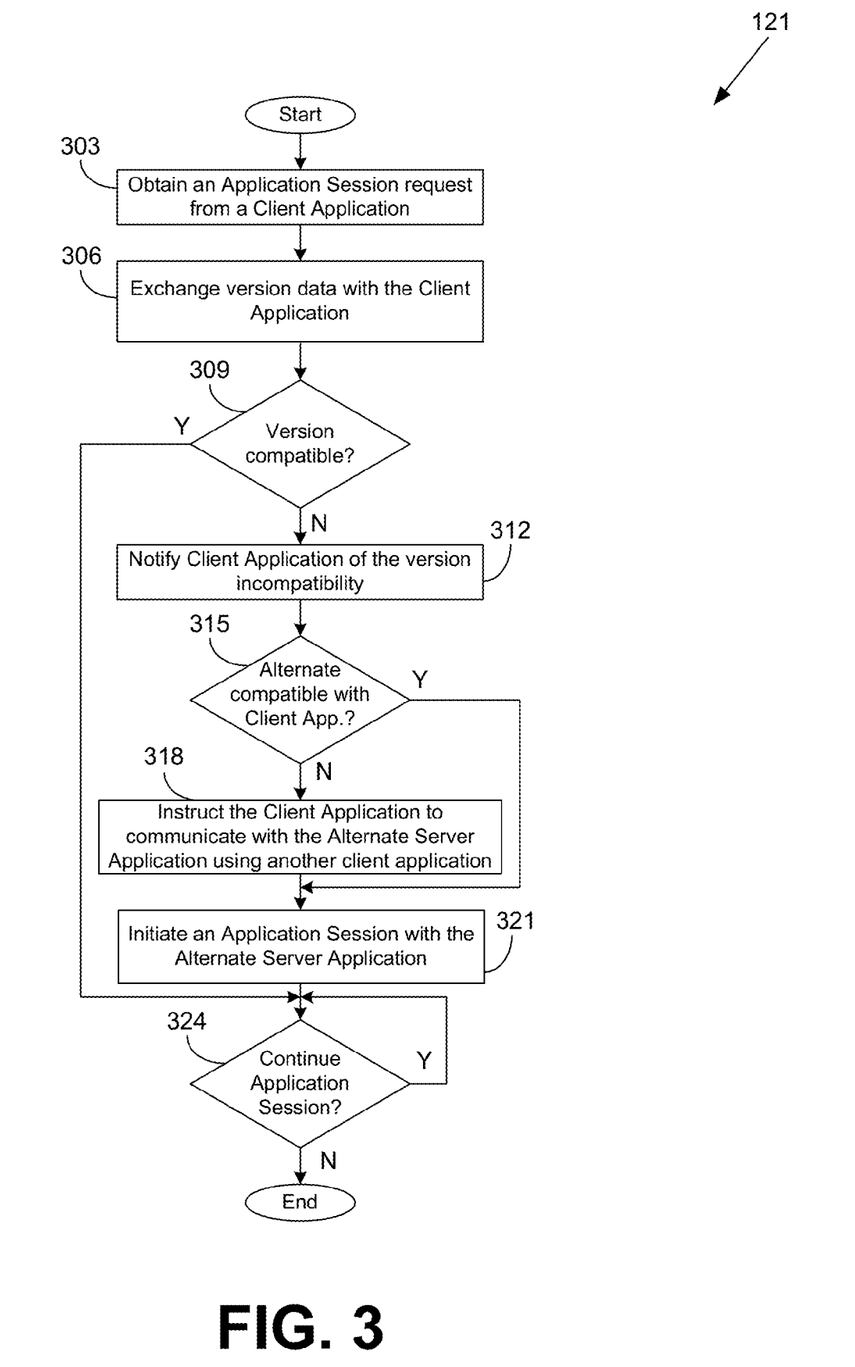
FIG. 3 is a flowchart illustrating one example of functionality implemented as portions of a primary server application executed in a computing device in the networked environment of FIG. 1 according to various embodiments of the present disclosure.

Referring next to FIG. 3, shown is a flowchart that provides one example of the operation of a portion of the primary server application 121 according to various embodiments. It is understood that the flowchart of FIG. 3 provides merely an example of the many different types of functional arrangements that may be employed to implement the operation of the portion of the primary server application 121 as described herein. As an alternative, the flowchart of FIG. 3 may be viewed as depicting an example of steps of a method implemented in the computing environment 103 (FIG. 1) according to one or more embodiments.

This portion of the primary server application 121 may be executed in response to a request from a client application 145 (FIG. 1) received via the network 109 (FIG. 1). Beginning with box 303, the primary server application 121 obtains a request for an application session from the client application 145. Next, in box 306, the primary server application 121 and the client application 145 exchange version information. As discussed previously, the version information may comprise general versions for the primary server application 121 and the client application 145.

Then, in box 309, the primary server application 121 may determine if the client application 145 is compatible with itself. The determination may be made based at least upon the version information exchanged, as well as compatibility information available to the primary server application 121 in the version table 137 (FIG. 1) and/or other sources. If the client application 145 is compatible, execution of the client application 145 proceeds to box 324. However, if the client application 145 is not compatible, execution of the client application 145 proceeds to box 312.

Next, in box 312, the primary server application 121 may notify the client application 145 of the version incompatibility. As discussed previously, the type of notice provided and any required action may depend upon the version information and/or the severity of the incompatibility. Subsequently, in box 315, the primary server application 121 may determine if the client application 145 is compatible with an alternate application server 124 (FIG. 1). The determination may be made based upon the version information of the client application 145, and version information of the alternate application server 124 contained in the version table 137 and/or other sources.

If the client application 145 is compatible with an alternate application server 124, then execution of the primary server application 121 proceeds to box 321. Alternatively, if the client application 145 is not compatible with an alternate application server 124, then execution of the primary server application 121 proceeds to box 318. In box 318, the primary server application 121 instruct the client application 145 to communicate with the alternate application server 124 using another application such as, for example, the browser 142 (FIG. 1) or an updated version of the client application 145.

Then, in box 321, the primary server application 121 may transfer any state or session information to the client application 145 and/or alternate server application 124, and direct the client application 145 to establish an application session with the alternate application server 124. Next, in box 324, the primary server application 121 determines if the application session should end. If the communication session should continue, execution of the primary server application 121 continues as shown. Alternatively, if the application session should end, execution of this portion of the primary server application 121 ends as shown.

Figure 4:
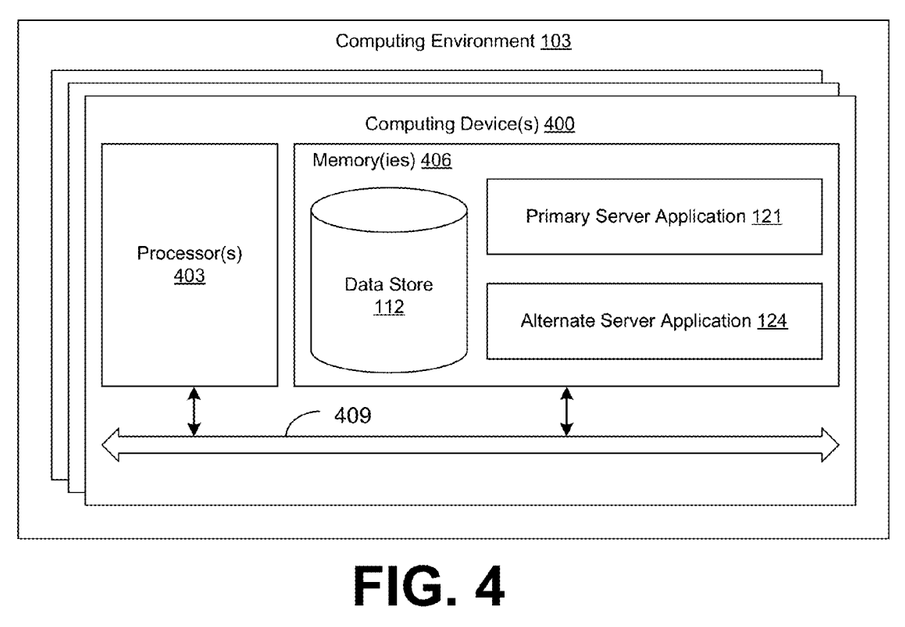
FIG. 4 is a schematic block diagram that provides one example illustration of a computing device employed in the networked environment of FIG. 1 according to various embodiments of the present disclosure.

With reference to FIG. 4, shown is a schematic block diagram of the computing environment 103 according to an embodiment of the present disclosure. The computing environment 103 may comprise one or more computing devices 400. The computing device 400 includes at least one processor circuit, for example, having a processor 403 and a memory 406, all of which are coupled to a local interface 409. To this end, the computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the primary server application 121, alternate server application 124, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the primary server application 121, alternate server application 124, browser 142, client application 145 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the client application 145 and the primary server application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the primary server application 121, alternate server application 124, browser 142, and client application 145, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, comprising:
    code that maintains an interface for communication, via a network, with a client application in a client computing device, the interface comprising a server version identifier;
    code that determines a measure of compatibility between the client application and the interface based at least upon the server version identifier and another server version identifier that is expected by the client application;
    code that transmits a notice to the client application based at least upon the measure of compatibility, the notice comprising an alert for a mandatory update to the client application;
    code that transmits the mandatory update to the client application, the mandatory update based at least upon the measure of compatibility meeting a predefined update threshold; and
    code that transmits a redirection instruction to the client application, the redirection instruction comprising a directive for the client computing device to establish a communication session with a web server application, the web server application executable in an alternate computing device.

2. The non-transitory computer-readable medium of claim 1, wherein the redirection instruction further comprises authentication data from the interface for use in the communication session with the web server application.

3. The non-transitory computer-readable medium of claim 1, wherein the redirection instruction further comprises a network address of the web server application.

4. A system, comprising:
at least one computing device; and
a primary server application executable in the at least one computing device, the primary server application comprising:
logic that maintains an interface for communication, via a network, with a client application in a client, the interface comprising a server version identifier;
logic that obtains another server version identifier that is expected by the client application; and
logic that generates, according to a measure of compatibility between the client application and the interface based at least in part on the server version identifier and the another server version identifier, a redirection instruction for the client application, the redirection instruction comprising a network address of an alternate server application.

5. The system of claim 4, wherein the primary server application further comprises logic that transmits a notice to the client application, the notice based at least upon the other server version identifier expected by the client application meeting a predefined notice threshold.

6. The system of claim 4, wherein the primary server application further comprises logic that transmits an update to the client application executable, the update based at least upon the other server version identifier expected by the client application meeting a predefined update threshold.

7. The system of claim 4, wherein the alternate server application is executable in an alternate computing device.

8. The system of claim 4, further comprising the alternate server application executable in the at least one computing device, the alternate server application comprising logic that communicates, via the network, with the client.

9. The system of claim 8, wherein the alternate server application comprises a network page server that communicates network page data to the client.

10. The system of claim 9, wherein the primary server application further comprises logic that obtains a client version identifier of the client application, wherein the redirection instruction further comprises a directive to communicate with the network page server using a browser application, the directive based at least upon the client version identifier.

11. The system of claim 10, wherein the client version identifier is obtained, via the network, from the client application.

12. A method, comprising:
establishing, via a network of a client computing device, data communication with an interface of a primary server application in at least one computing device, the interface comprising a server version identifier;
obtaining, in the client computing device, the server version identifier; and
establishing, via the network of the client computing device, data communication with an alternate server application based at least upon the server version identifier.

13. The method of claim 12, further comprising generating, in the client computing device, a notice to a user, the notice based at least upon a value of the server version identifier.

14. The method of claim 12, wherein establishing data communication with an alternate server application further comprises using authentication data associated with the interface of the primary server application.

15. The method of claim 12, further comprising:
transmitting, via the network of the client computing device, a redirection request to the primary server application, the redirection request comprising a client version identifier; and
obtaining, in the client computing device, a redirection response, the redirection response comprising a network address of the alternate server application.

16. The method of claim 15, wherein the redirection response further comprises a uniform resource identifier (URI) corresponding to an update for a client application in the client computing device.

17. The method of claim 15, wherein the redirection response further comprises a directive to communicate with the alternate server application using a browser application on the client computing device.

18. The method of claim 12, wherein a network address of the alternate server application is predefined within the client computing device.

19. The method of claim 12, wherein the alternate server application comprises a network page server that communicates network page data to the client computing device.

20. The method of claim 12, wherein the alternate server application is executable in the at least one computing device.

* * * * *